(12) United States Patent
Treichler et al.

(10) Patent No.: US 6,388,824 B1
(45) Date of Patent: May 14, 2002

(54) METHODS FOR HOLDING COMPONENTS IN AN OPTICAL ASSEMBLY

(75) Inventors: George D. Treichler, Hammondsport; Todd M. Wetherill, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/552,427

(22) Filed: Apr. 19, 2000

(51) Int. Cl.[7] .............................. G02B 7/02; G02B 6/00
(52) U.S. Cl. ..................... 359/819; 385/135; 385/137
(58) Field of Search .................... 359/811, 819, 359/821; 385/134, 135, 136, 137; 174/50, 52.1, 59

(56) References Cited

U.S. PATENT DOCUMENTS

| | | | | |
|---|---|---|---|---|
| 4,383,735 A | * | 5/1983 | Stravitz | 359/892 |
| 5,526,194 A | * | 6/1996 | Ruffell | 359/827 |
| 5,566,268 A | * | 10/1996 | Radliff et al. | 385/137 |
| 5,572,617 A | * | 11/1996 | Bernhardt et al. | 385/135 |
| 5,734,777 A | * | 3/1998 | Merriken et al. | 385/135 |
| 6,215,945 B1 | * | 4/2001 | Fukuyama et al. | 385/137 |

FOREIGN PATENT DOCUMENTS

WO    WO 00/42462    7/2000

* cited by examiner

*Primary Examiner*—Ricky Mack
(74) *Attorney, Agent, or Firm*—Mary Y. Redman; James V. Suggs (57) ABSTRACT

A component holder has a base and a component holding block extending upward from the base. The component holding block includes a pair of walls, the walls defining between them a channel dimensioned to closely receive an optical component cradled in a resiliently compliant member, such as a pad or a shaped component. An optical component is loaded into the channel by placing the optical component and a resiliently compliant member over the channel and wedging the optical component and the resiliently compliant member into the channel such that the optical component is cradled inside of the resiliently compliant member and such that the optical component and the resiliently compliant member are held in position in the channel by friction.

16 Claims, 11 Drawing Sheets

METHODS FOR HOLDING COMPONENTS IN AN OPTICAL ASSEMBLY

BACKGROUND OF THE INVENTION

1. Field of the Invention

The present invention relates generally to improvements to the field of optical devices, and more particularly to aspects of systems and methods for holding components in an optical assembly.

2. Description of the Prior Art

There are currently being manufactured and developed a number of devices and systems for use in fiber-optic networks. These devices and systems include, for example, optical amplifiers which provide direct amplification of fiber-optic digital signals without the need to convert the light signal into an electrical signal.

These fiber-optic devices and systems typically include a number of discrete optical components that are mounted to a motherboard or other suitable platform. Depending upon their size and shape, these optical components are typically mounted to the motherboard using a number of different techniques. Certain components are mounted singly or in pairs to specially designed component holders that are attached to the motherboard. Other components are attached directly to the motherboard. It is desirable from a manufacturing viewpoint, to decrease the number of parts and the amount of time required to perform the mounting function. It is further desirable to use the space within the device as efficiently as possible.

SUMMARY OF THE INVENTION

An aspect of the invention provides a method for holding components in an optical assembly using a component holder. The component holder has a base and a component holding block extending upward from the base. The component holding block includes a pair of walls, the walls defining between them a channel dimensioned to closely receive an optical component cradled in a resiliently compliant member, such as a pad or a shaped component. An optical component is loaded into the channel by placing the optical component and a resiliently compliant member over the channel and wedging the optical component and the resiliently compliant member into the channel such that the optical component is cradled inside of the resiliently compliant member and such that the optical component and the resiliently compliant member are held in position in the channel by friction.

DETAILED DESCRIPTION

The present invention now will be described more fully with reference to the accompanying drawings, in which currently preferred embodiments of the invention are shown. However, the described invention may be embodied in various forms and should not be construed as limited to the exemplary embodiments set forth herein. Rather, these representative embodiments are described in detail so that this disclosure will be thorough and complete, and will fully convey the structure, operation, functionality and potential scope of applicability of the invention to those skilled in the art.

Figure 1:
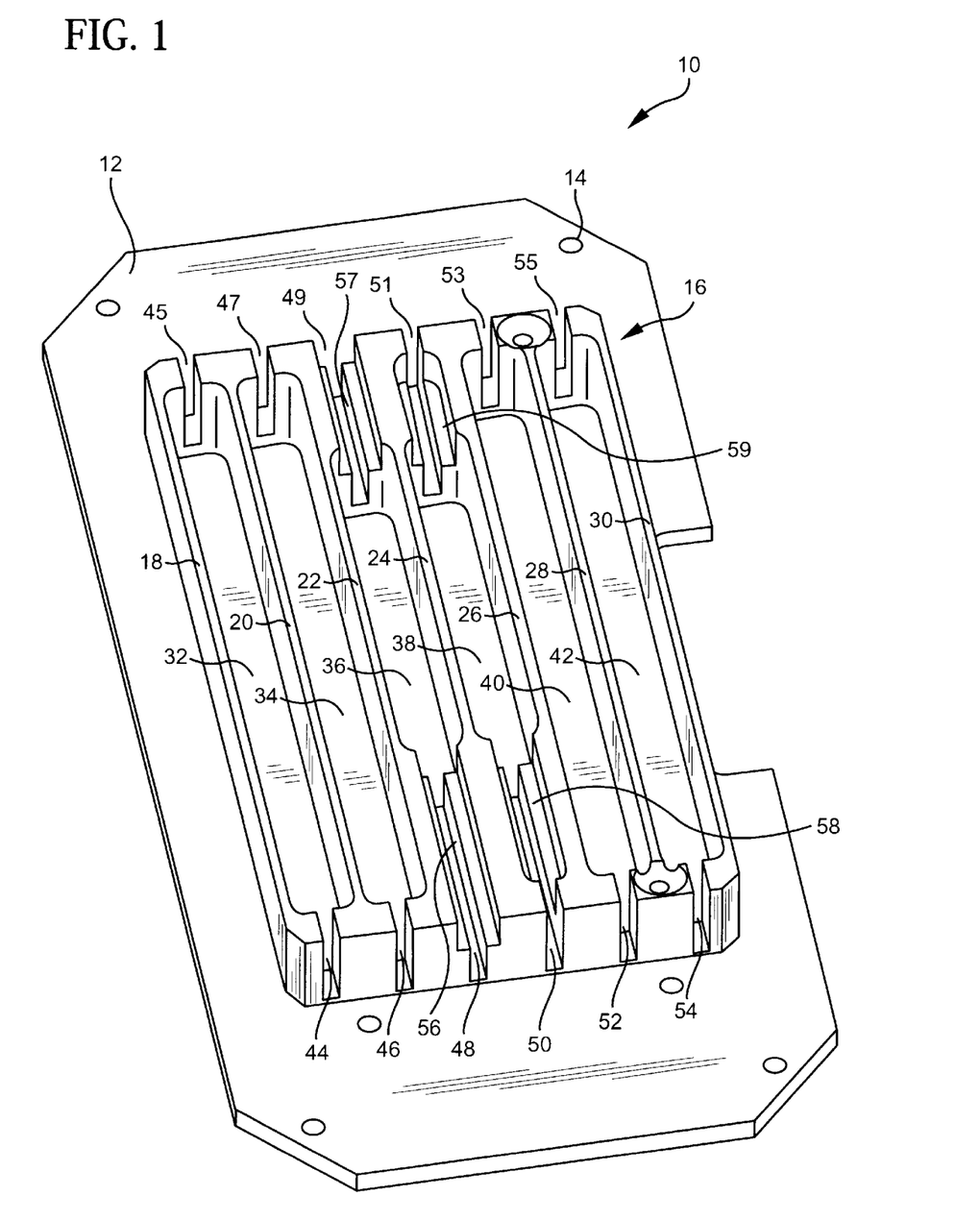
FIGS. 1 shows a perspective view of a first embodiment of a component holder according to the present invention.

FIG. 1 shows a first embodiment of a component holder 10 according to the present invention. In the present embodiment, the component holder 10 is fabricated from a single piece of machined aluminum. However, it would also be possible to manufacture the component holder 10 using other materials and multiple pieces without departing from the spirit of the present invention. The holder 10 includes a base 12 that is mounted onto a motherboard or other suitable platform using rivets or screws that pass through holes 14 provided for that purpose.

Projecting upwards from the base 12 is a component holding block 16. The block 16 includes seven parallel walls 18–30 that define between them six channels 32–42. Each channel is dimensioned to receive an optical component. At either end of each channel is a slot 44–55 for providing an exit path for optical fiber leads extending from components held in each respective channel 32–42.

Channels 32, 34, 40, and 42 have substantially the same shape and size. Channel 36 includes a central section having the same depth and width as channels 32, 34, 40, and 42. In addition, channel 36 includes at either end a section 56, 57 having a narrower width and shallower depth than the central portion. These narrower sections 56, 57 extend to the outer perimeter of the component holding block 16. Like channel 36, channel 38 has a larger central section and two smaller sections 58, 59 at either end. However, these narrower channels 58, 59 do not extend all the way to the exterior of the holding block 16, but instead terminate just within the outer perimeter of the block 16. The number, size, shape, and orientation of the channels 32–42 can be varied, as dictated by the particular optical device being constructed.

FIGS. 2A through 2D show perspective views of various exemplary optical components that can be loaded into the component holder 10 shown in FIG. 1. These components are, respectively, a gain flattening filter (GFF) 60, an isolator 66, a box component 72, and a smaller diameter wavelength division multiplexer (WDM) or tap coupler 78. Each component has a body portion 62, 68, 74, 80 and a pair of optical fiber leads 64–65, 70–71, 76–77, and 82–83, respectively. It should be noted that although the present embodiment of the invention is illustrated with components each having two optical fiber leads, one extending from either end, the invention may also be practiced with components having more than two leads, or with leads extending from only one end.

Figure 2A:
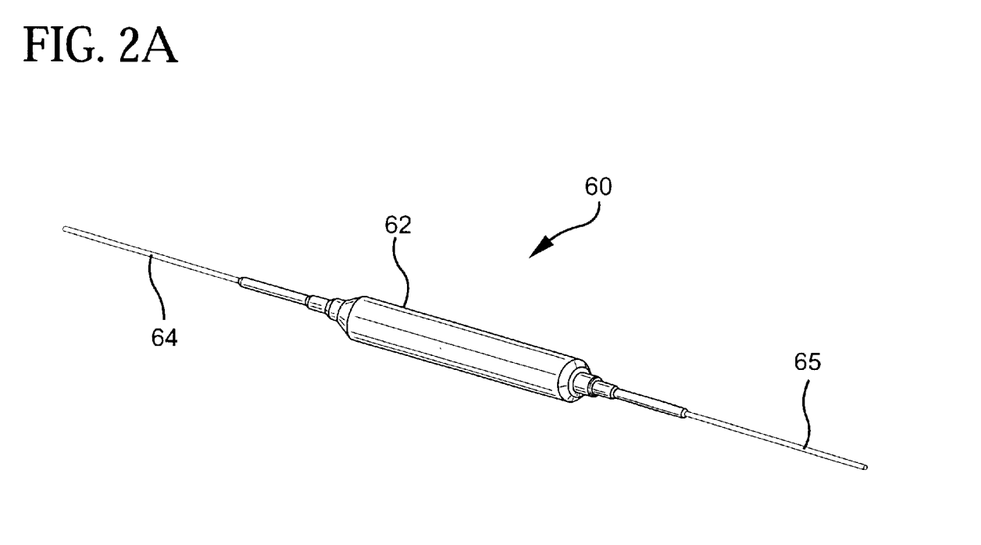
FIGS. 2A through 2D show various optical components to be loaded into the component holder shown in FIG. 1.
Figure 2B:
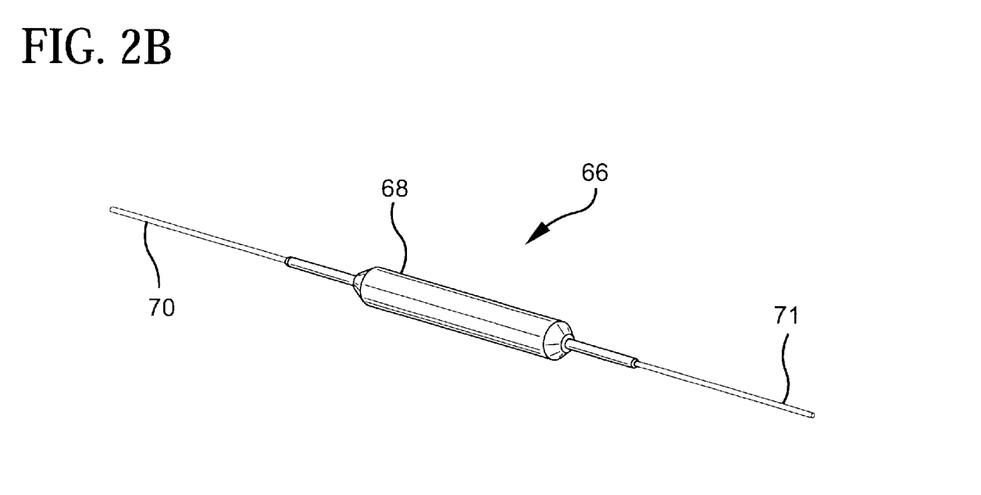
Figure 2C:
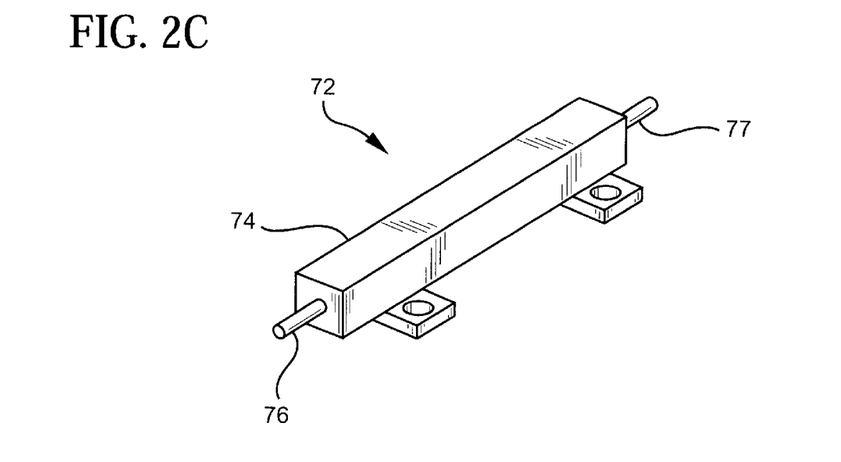
Figure 2D:
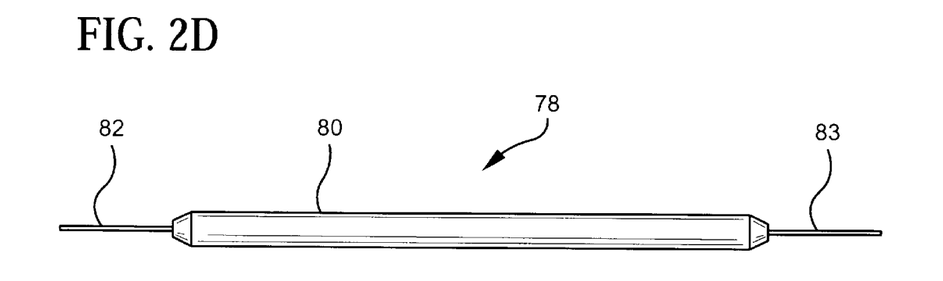
Figure 3A:
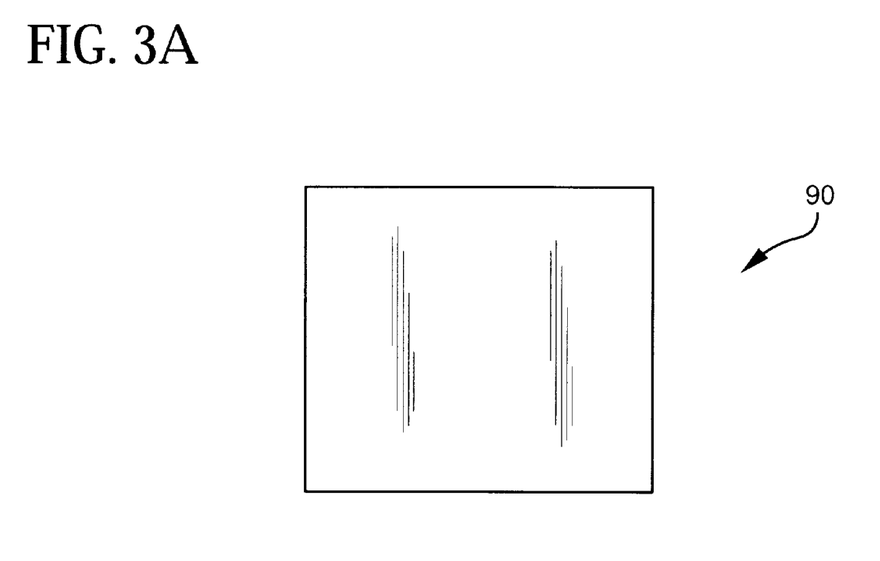
FIGS. 3A through 3C show, respectively, front, side and rear views of a resiliently compliant pad for use with the component holder and components shown in FIGS. 1 and 2A through 2D.
Figure 3B:
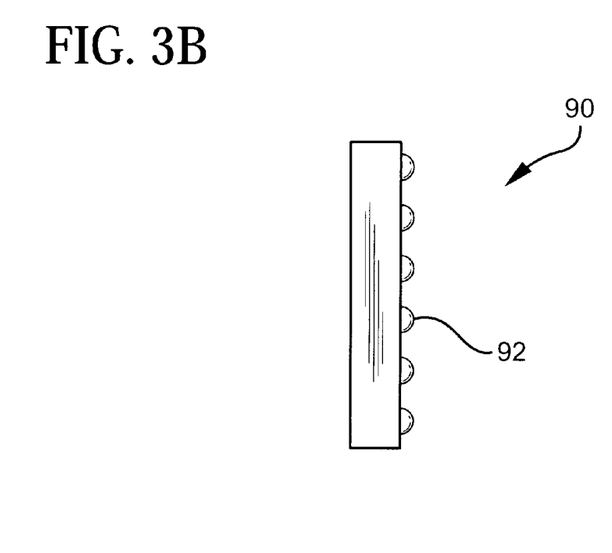
Figure 3C:
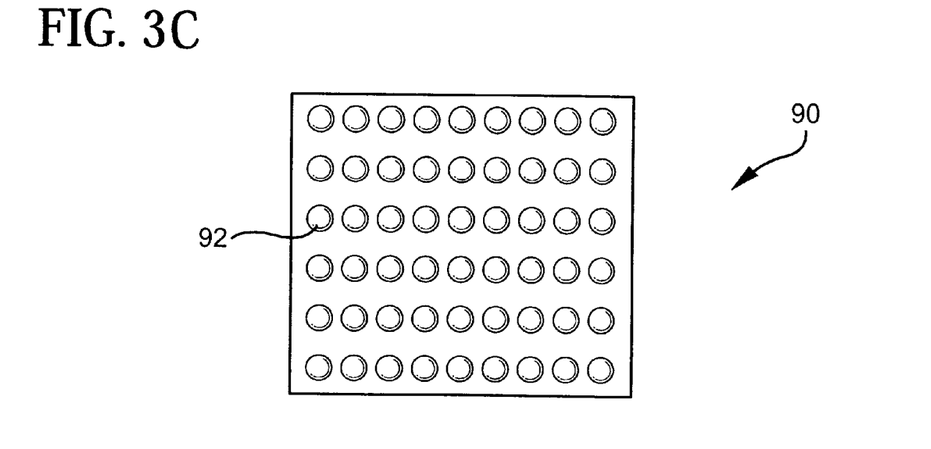

FIGS. 3A through 3C show, respectively, front, side, and rear views of a resiliently compliant member 90 that can be used in conjunction with the component holder 10 shown in FIG. 1 to hold optical components such as those shown in FIGS. 2A through 2D. In the present embodiment, the resiliently compliant member 90 is shaped as a square pad, and is fabricated from silicone foam or other suitably compliant polymer with a high compression setpoint. Further, in the present embodiment, the pad has a textured, "bumpy" side and a smooth side. The texture bumps 92 (not drawn to scale) are illustrated in FIGS. 3B and 3C. It should be noted that it would also be possible to practice the present invention using a resiliently compliant pad having two smooth sides.

Figure 3D:
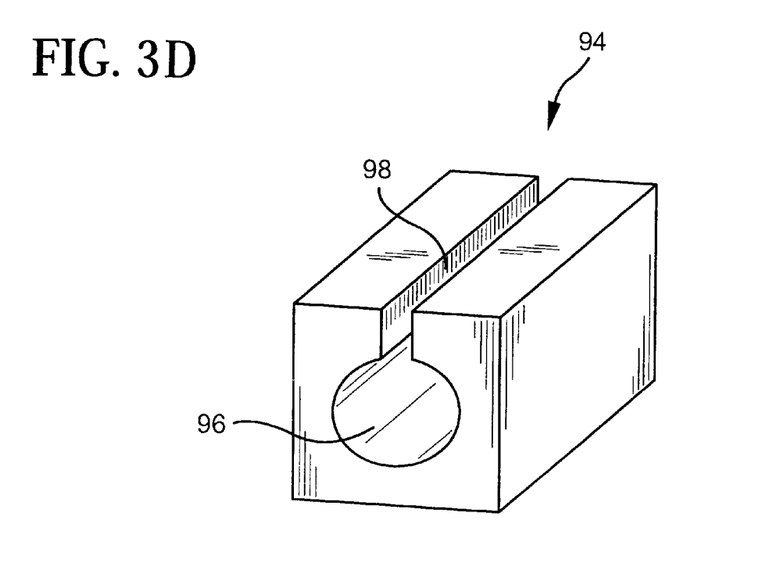
FIG. 3D shows a perspective view of a resiliently compliant cradle for use with the component holder and components shown in FIGS. 1 and 2A through 2D.

FIG. 3D shows a perspective view of an alternative embodiment of a resiliently compliant member 94 that can be used in conjunction with the component holder 10 shown in FIG. 1. As shown in FIG. 3D, the alternative resiliently compliant member 94 is a block-shaped cradle that is dimensioned to fit snugly inside a component channel 32–42. The cradle 94 includes a hollowed-out central cavity 96 that is dimensioned to closely receive an optical component, such as those illustrated in FIGS. 2A–D. The cradle 96 further includes a slot 98 cut into one side, which provides access to the central cavity 96. An optical component is loaded into the cradle 94 by aligning it on top of the access slot and then urging it downward into the central cavity 96. The sides of the access slot 98 are sufficiently compliant to admit the optical component. However, the sides of the access slot 98 are also sufficiently resilient such that after the optical component has been properly seated in the central cavity, the sides of the slot 98 close up over the optical component, holding it in place. It would also be possible to load a component into the cradle 94 by inserting the component into one of the exposed ends of the central cavity 96 and then sliding it into position.

Figure 4A:
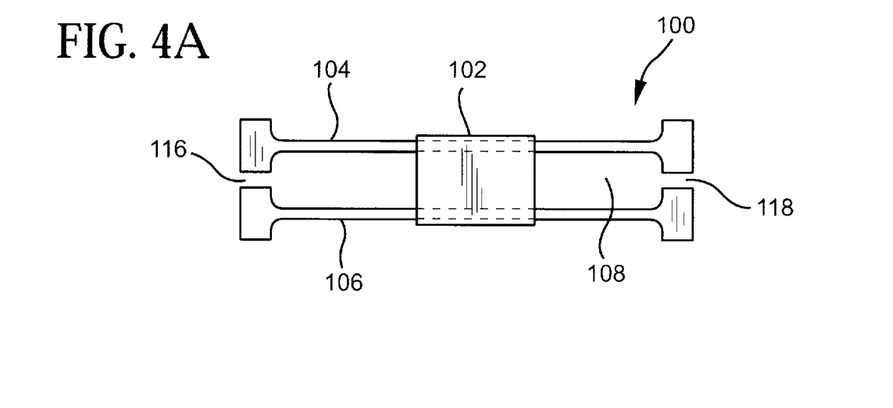
FIGS. 4A and 4B show a partial top view of a portion of a component holder according to the present invention, illustrating a first mode of loading a component and resiliently compliant pad into the holder.
Figure 4B:
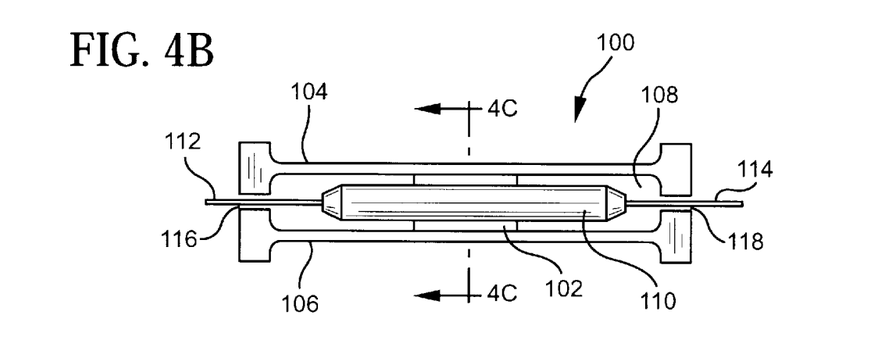
Figure 4C:
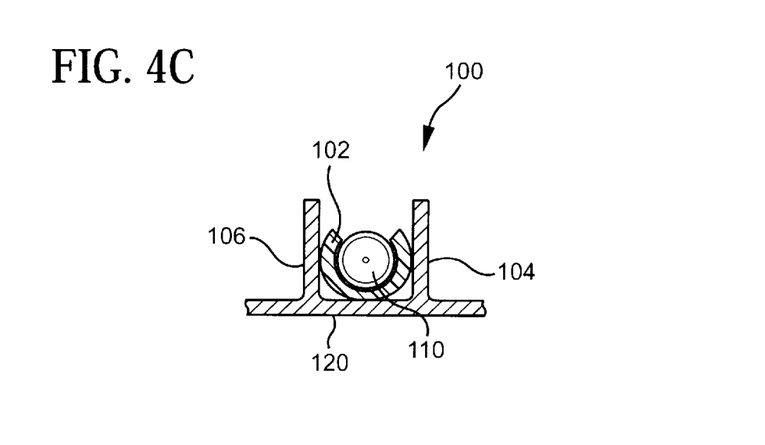
FIG. 4C shows a cross section of the component holder shown in FIG. 4B through the plane 4C—4C.

FIG. 4A shows a top view of a section of a component holder 100, such as the one shown in FIG. 1, discussed above. A resiliently compliant member 102, such as the pad shown in FIGS. 3A through 3C, has been placed with its textured side facing upwards over a pair of adjacent walls 104, 106 defining a channel 108. As illustrated in FIG. 4B, an optical component 110 is placed on top of the pad 102, centered between the adjacent walls 104, 106 over the length of the channel 108, and is then pushed downward between the walls 104, 106, making sure that the foam pad 102 stays centered around the component 110. FIG. 4C shows a cross section of the pad 102, walls 104, 106, and component 110 shown in FIG. 4B through the plane 4C—4C. The component's optical fiber leads 112, 114 extend out of the holder 100 through slots 116, 118 at either end of the channel 108. As shown in FIG. 4C, the pad 102 cradles the optical component 110 and makes contact with both walls 104, 106 and with the base 120 of the component holder 100. Friction between the pad 102 and the walls 104, 106 holds the component 110 firmly in position. However, the component 110 may be readily pulled free from the component holder 110, as needed. It would be possible for the pad 102 to make contact only with the walls 104, 106 and be suspended above the base 120 of the component holder. Also, if the channel 108 is made deeper, it would be possible to stack components, each with its own pad, one on top of each other within the channel 108. If desired, multiple pads may be used.

The arrangement shown in FIGS. 4A–4C is particularly suited for use with the GFF 60 shown in FIG. 2A, the isolator 66 shown in FIG. 2B, and the box component 72 shown in FIG. 2C. Box components are inserted "feet up." These components would be loaded into one of channels 32, 34, 40, and 42 of the component holder shown in FIG. 1.

Figure 5A:
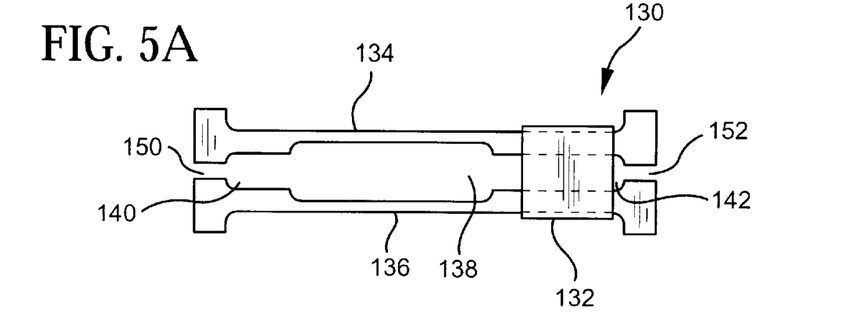
FIGS. 5A and 5B show a partial top view of a portion of a component holder according to the present invention, illustrating a second mode of loading a component and pad into the holder.
Figure 5B:
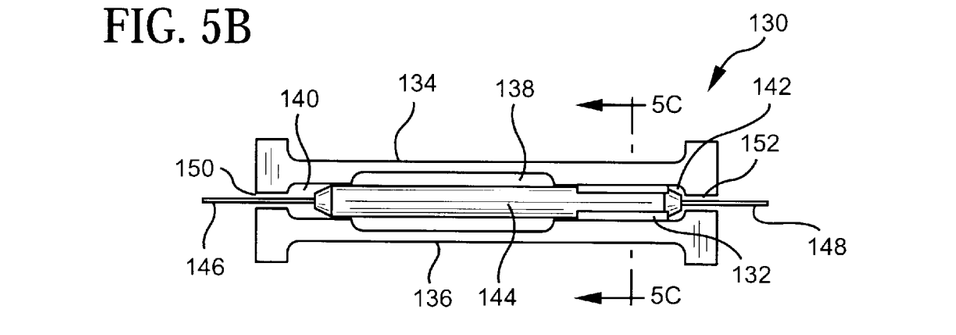
Figure 5C:
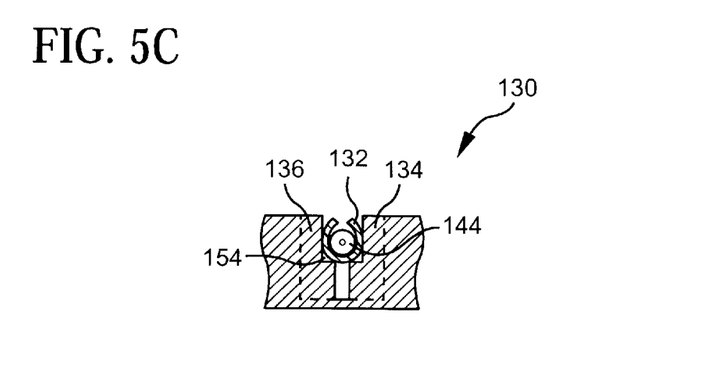
FIG. 5C shows a cross section of the component holder shown in FIG. 5B through the plane 5C—5C.

FIG. 5A shows a top view of another section of a component holder 130, in which a pad 132 has been placed over a second pair of adjacent walls 134, 136. Here, the adjacent walls 134, 136 define a channel 138 having two smaller side sections 140, 142 at either end. This channel 138 corresponds to channel 38 shown in FIG. 1. The pad 132 is placed over one of the narrower side sections 140, 142. As shown in FIG. 5B, an optical component 144 is placed on top of the pad 132 between the adjacent walls 134, 136, and is then wedged downward between the walls 134, 136, making sure that the component 144 remains centered over the pad 132. FIG. 5C shows a cross section of the pad 132, walls 134, 136, and component 144. The component's optical fiber leads 146, 148 extend out of the holder 130 through slots 150, 152. As shown in FIG. 5C, the pad 132 surrounding the optical component 144 makes contact with both walls 134, 136 and with the base 154 of the channel's narrower side section 142. Again, friction between the pad 132 and the walls 134, 136 holds the component 144 firmly in position. It would be possible for the pad 132 to make contact only with the walls 134, 136 and be suspended above the base 154. It will be appreciated that the use of a larger inner channel 138 and narrower outer sections 140, 142 provides room for tools to install, adjust the position of, and remove the optical component.

Figure 6A:
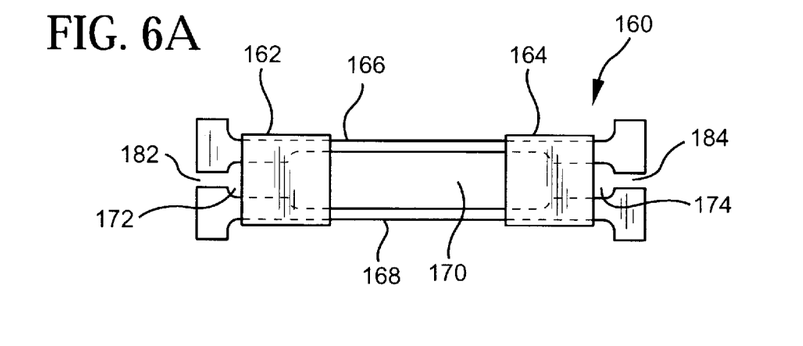
FIGS. 6A and 6B show a partial top view of a portion of a component holder according to the present invention, illustrating a third mode of loading component and pad into the holder.
Figure 6B:
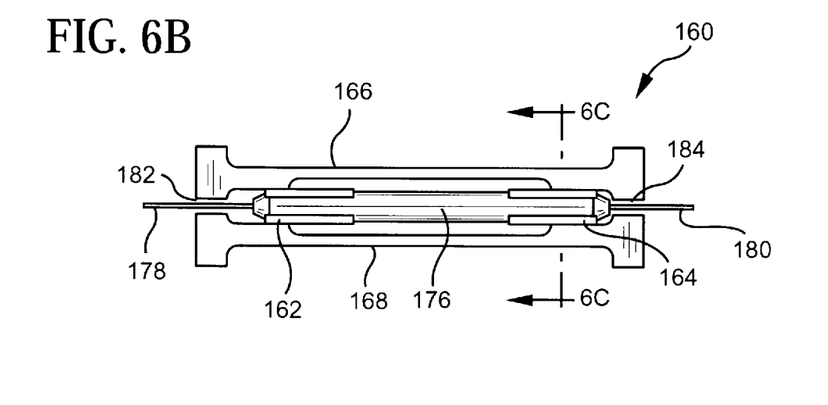
Figure 6C:
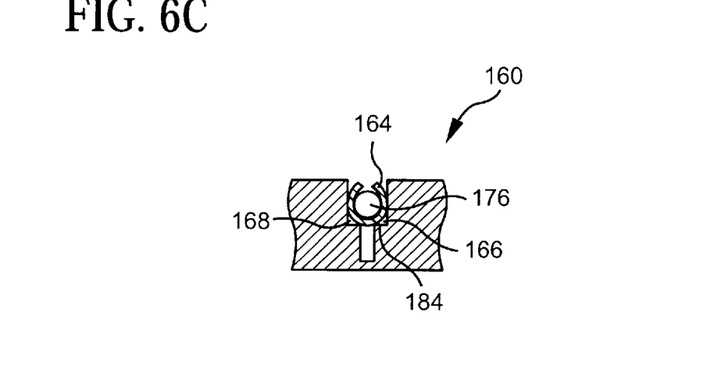
FIG. 6C shows a cross section of the component holder shown in FIG. 6B through the plane 6C—6C.

FIG. 6A shows a top view of a third section of a component holder 160, in which a pair of foam pads 162, 164 has been placed over a pair of adjacent walls 166, 168 in the component holder 160. Again, the adjacent walls 166, 168 define a channel 170 having two smaller side sections 172, 174. Channel 170 in FIG. 6A corresponds to channel 38 illustrated in FIG. 1. A foam pad 162, 164 is placed over each of the narrower side sections 172, 174. As illustrated in FIG. 6B, an optical component 176 is placed on top of both foam pads 162, 164 between the adjacent walls 166, 168, and is then wedged downward between the walls 166, 168. FIG. 6C shows a cross section of a pad 164, the walls 166, 168, and component 176 through the plane 6C—6C. As shown in FIG. 6B, the component's optical fiber leads 178, 180 extend out of the holder 160 through slots 182, 184. As shown in FIG. 6C, the pads 162, 164 surrounding the optical component 176 make contact with both walls 166, 168 and with the base 184 of the channel's narrower side sections 172, 174. Again, friction between the pads 162, 164 and the walls 166, 168 holds the component 176 firmly in position. It would be possible for the pads 162, 164 to make contact only with the walls 166, 168 and be suspended above the base 184. In the present embodiment of the invention, the arrangement shown in FIG. 6A is used to hold long, thin optical components, such as the optical component 78 shown in FIG. 2D.

In some cases, it is advantageous to hold the component at both ends, as illustrated in FIGS. 6A–C, and sometimes at only one end, as illustrated in FIGS. 5A–C. The decision as to whether to hold a component at both ends or at only one end depends to a large extent upon the construction and nature of the optical device being inserted into the channel. For example, an optical component which, by its construction, is sensitive to side bending loads would be installed with only one pad.

It will be appreciated that the above-described technique for loading an optical component into a channel in a component holder such as the one illustrated in FIG. 1 may also be used with the resiliently compliant cradle 94 shown in FIG. 3D. The optical component is first loaded into the cradle's central cavity 96, either through the access slot 98 or by inserting the component into one end of the central cavity and sliding the component into position. The optical component and cradle and then centered on top of the appropriate channel in the component block with the optical component aligned over the length of the channel. The optical component and cradle are then wedged downward into the channel, similar to the way in which the optical component and pad are wedged into the channel as described above. The optical component and cradle and then held in position in the channel by friction.

Figure 7:
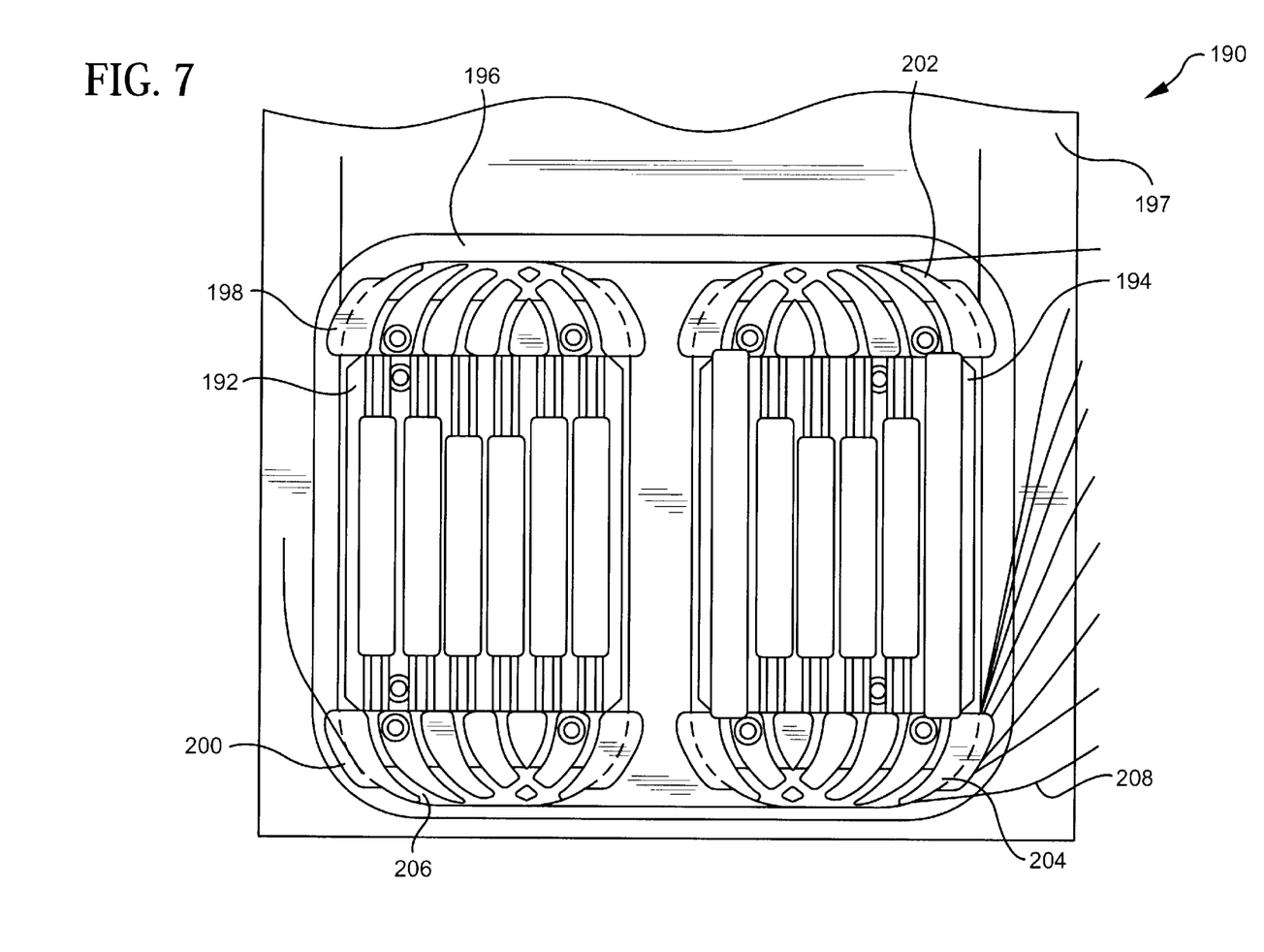
FIG. 7 shows a plan view of the interior of an alternative embodiment of a component holding system according to the present invention.

FIG. 7 shows a plan view of a component holding assembly 190 according to a further embodiment of the present invention. As shown in FIG. 7, the assembly 190 includes a pair of component holders 192, 194 that are mounted onto a platform 196, which in turn is mounted to a motherboard 197 or other supporting structure. Each component holder 192, 194 has mounted at either end a one-piece fiber guide block 198, 200, 202, 204 having guide channels 206 formed therein for guiding the optical fiber leads 208 out to the rest of the device. It will be appreciated that it would be possible to employ the assembly 190 in FIG. 7 in a modular construction technique, in which the component holding platform 196 with the component holding blocks 192, 194 and guide blocks 198, 200, 202, 204 could be assembled separately from an optical device and then installed into the device in a single step.

Figure 8A:
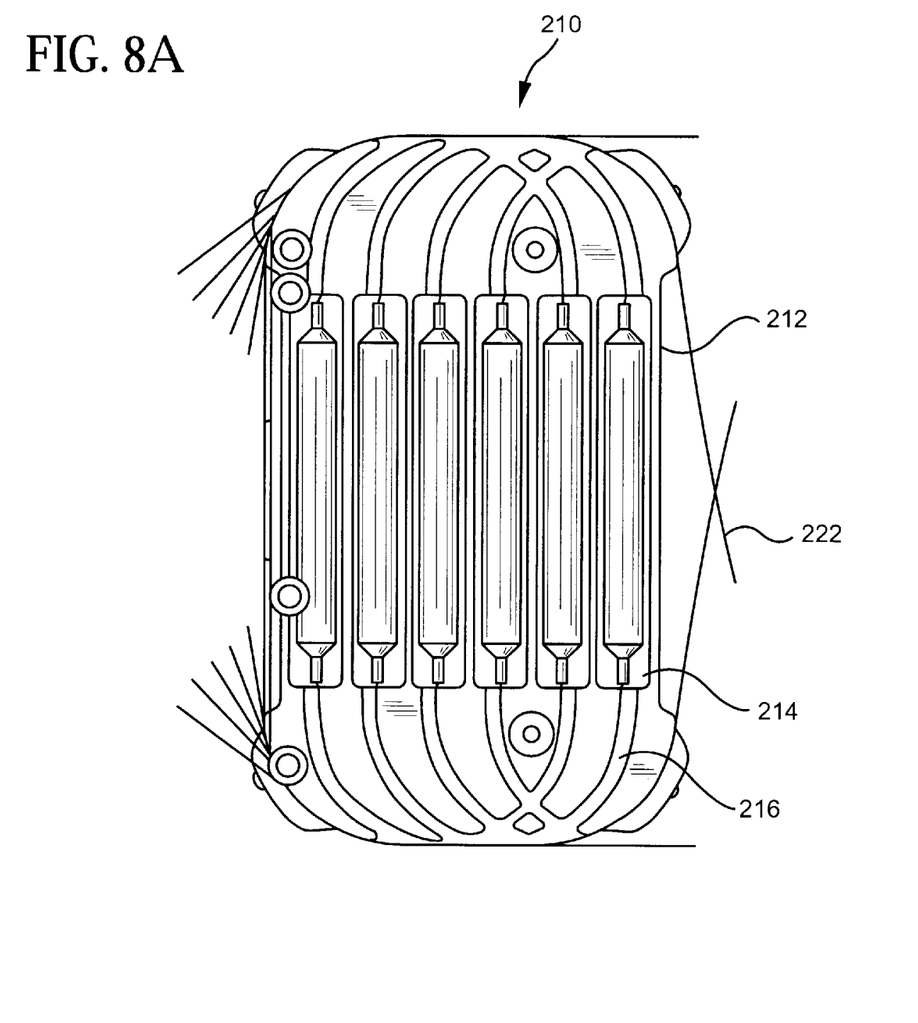
FIGS. 8A and 8B show, respectively, plan and side views of the interior of a further alternative embodiment of a component holding system according to the present invention.
Figure 8B:
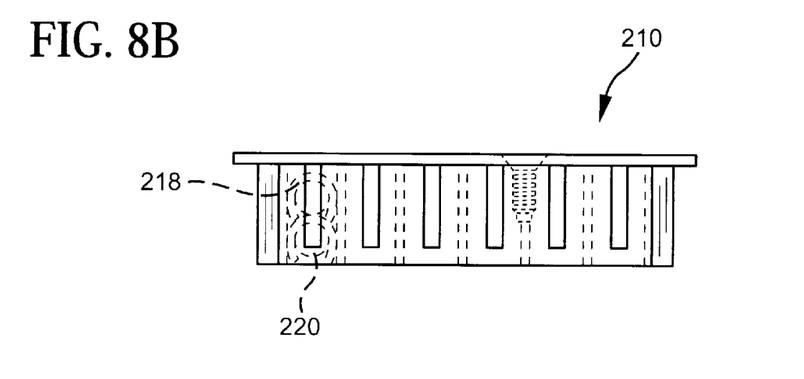

FIGS. 8A and 8B show, respectively, plan and front views of an alternative embodiment of a component holder 210 according to the present invention. As shown in FIG. 8A, the component holder 210 includes a component holding section 212 with six component holding channels 214 and a series of integrally formed guide channels 216. FIG. 8B illustrates the stacking of optical components 218, 220 one on top of the other within a component holding channel 214. As shown in FIG. 8A, optical fiber leads 222 are routed through the guide channels 216 and around the outer perimeter of the component holder 210.

Figure 9A:
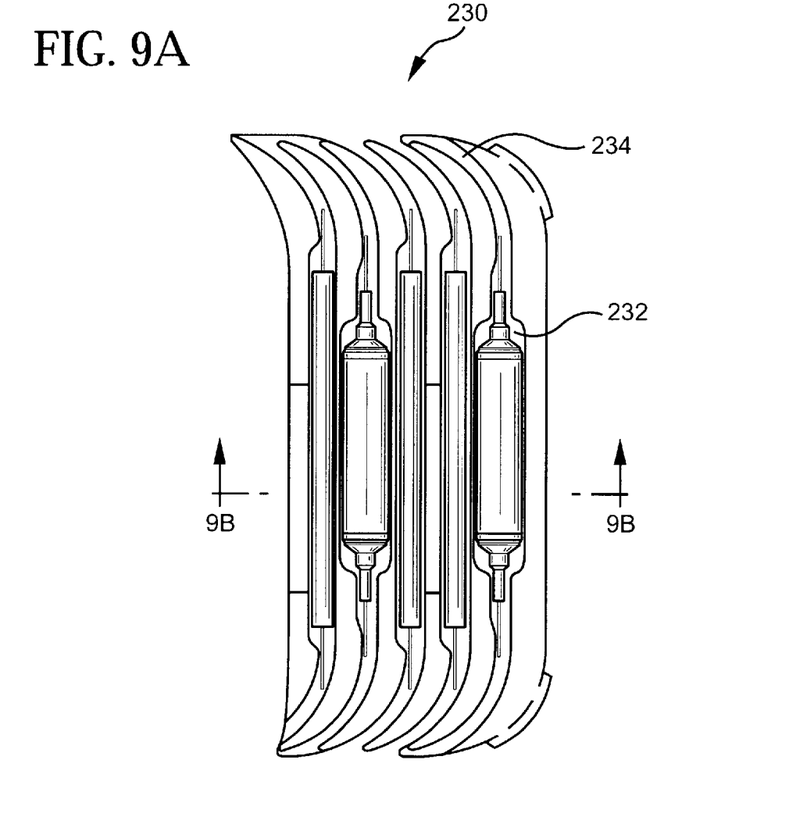
FIG. 9A shows a plan view of the interior of a third alternative embodiment of a component holding system according to the present invention.
Figure 9B:
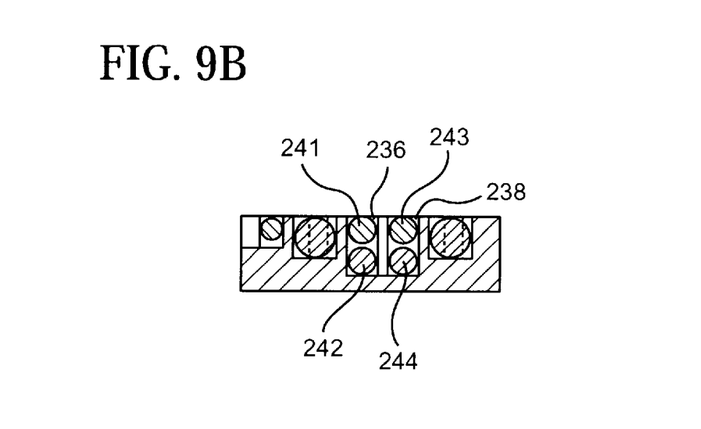
FIG. 9B shows a cross section of the component holding system shown in FIG. 9A through the plane 9B—9B.

FIG. 9A shows a plan view of a further alternative embodiment of a component holder 230 according to the present invention. FIG. 9B shows a cross section of the component holder 230 shown in FIG. 9A through the plane 9B—9B. Again, the component holder 230 includes component holding channels 232 and integrally formed guide channels 234. As shown in FIG. 9B, two of the component holding channels 236, 238 are each dimensioned to receive a respective pair of optical components 241–242 and 243–244, one on top of the other.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined by the claims appended hereto and that the claims be interpreted as broadly as permitted by the prior art.

We claim:

1. A method for holding an optical component in a device, the method comprising the steps of:
    (a) providing a component holder comprising a base and a component holding block extending upward from the base, the component holding block including a pair of walls, the walls defining between them a channel;
    (b) placing a resiliently compliant member over the channel;
    (c) placing the optical component over the channel, the channel being dimensioned to closely receive the optical component and the resiliently compliant member;
    (d) wedging the optical component and the resiliently compliant member into the channel such that the optical component is cradled inside of the resiliently compliant member and such that the optical component and the resiliently compliant member are held in position in the channel by friction.

2. The method of claim 1 wherein step (d) includes wedging the optical component and the resiliently compliant member into the channel until the resiliently compliant member makes contact with the base.

3. The method of claim 1 wherein step (d) includes wedging the optical component and the resiliently compliant member into the channel without making contact with the base.

4. The method of claim 1, wherein in step (a), the channel is dimensioned to receive a plurality of optical components cradled in resiliently compliant members, one on top of the other, and wherein the method further includes the following steps performed after step (d):
    (e) placing a second resiliently compliant member over the channel;
    (f) placing a second optical component over the channel; and
    (g) wedging the second optical component and the second resiliently compliant member into the channel such that the second optical component is cradled in the second resiliently compliant member and such that the second optical component and resiliently compliant member are held in position in the channel by friction over the first optical component and resiliently compliant member.

5. The method of claim 1, wherein the channel is dimensioned to closely receive an optical component cradled in a plurality of resiliently compliant members; wherein in step (b) a plurality of resiliently compliant members are placed over the channel; and wherein in step (d), the optical component and the plurality of resiliently compliant members are wedged into the channel such that the optical component is cradled inside of the plurality of resiliently compliant members and such that the optical component and the plurality of resiliently compliant members are held in position in the channel by friction.

6. A method for holding an optical component having leads in a device, the method comprising the steps of:
   (a) providing a component holder comprising a base and a component holding block extending upward from the base, the component holding block including a pair of walls, the walls defining between them a channel;
   (b) placing a resiliently compliant member over the channel;
   (c) placing the optical component over the channel, the channel being dimensioned to closely receive the optical component and the resiliently compliant member; and
   (d) inserting the optical component and the resiliently compliant member into the channel such that the optical component is cradled inside of the resiliently compliant member and such that the optical component and the resiliently compliant member are held in position in the channel by friction.

7. The method of claim 6 wherein step (d) includes inserting the optical component and the resiliently compliant member into the channel until the resiliently compliant member makes contact with the base.

8. The method of claim 6 wherein step (d) includes inserting the optical component and tie resiliently compliant member into the channel without making contact with the base.

9. The method of claim 6, wherein in step (a) the channel is dimensioned to receive a plurality of optical components cradled in resiliently compliant members, one on top of the other, and wherein the method further includes the following steps performed after step (d):
   (e) placing a second resiliently compliant member over the channel;
   (f) placing a second optical component over the channel; and
   (g) inserting the second optical component and the second resiliently compliant member into the channel such that the second optical component is cradled in the second resiliently compliant member and such that the second optical component and resiliently compliant member are held in position in the channel by friction over the first optical component and resiliently compliant member.

10. The method of claim 6, wherein the channel is dimensioned to be wider than the optical component and to closely receive the optical component cradled in a plurality of resiliently compliant members; wherein in step (b) a plurality of resiliently compliant members are placed over the channel; and wherein in step (d) the optical component and the plurality of resiliently compliant members are inserted into the channel such that the optical component is cradled inside of the plurality of resiliently compliant members and such that the optical component and the resiliently compliant members are held in position in the channel by friction.

11. The method of claim 6, wherein the resiliently compliant member is a cradle dimensioned to fit closely within the channel, the cradle having a central cavity dimensioned to closely receive the optical component, and wherein in step (c), the optical component is placed in the central cavity of the cradle.

12. The method of claim 11, wherein the cradle includes a slot providing access to the central cavity.

13. The method of claim 6, wherein each end of the channel terminates in a slot, and wherein when the optical component is loaded into the channel, the optical component leads extend out of the channel through the slots.

14. The method of claim 6, wherein the channel includes a larger central channel and two smaller channels on either end of the larger central channel, each of the smaller channels being dimensioned to be wider than the optical component and to receive the optical component cradled in the resiliently compliant member, the optical component extending through the larger central channel.

15. The method of claim 6, wherein the component block includes a plurality of parallel walls, wherein each of the plurality of parallel walls is adjacent to at least one other of the plurality of parallel walls, the adjacent walls defining between them the channel dimensioned to be wider than the optical component and to receive an optical component cradled in a resiliently compliant member.

16. The method of claim 15, wherein each end of each channel of the component block terminates in a slot, such that when optical components having leads are loaded into the channels, the optical component leads extend out of the channels through the slots.

* * * * *